United States Patent
Sohn et al.

(10) Patent No.: US 8,886,835 B2
(45) Date of Patent: Nov. 11, 2014

(54) TRANSCODING METHOD AND APPARATUS OF MEDIA SERVER AND TRANSCODING REQUEST METHOD AND APPARATUS OF CONTROL POINT

(75) Inventors: Young-chul Sohn, Gangnam-gu (KR); Ho Jin, Yongin-si (KR); Jung-yon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1419 days.

(21) Appl. No.: 11/698,882

(22) Filed: Jan. 29, 2007

(65) Prior Publication Data

US 2007/0239896 A1 Oct. 11, 2007

(30) Foreign Application Priority Data

Apr. 5, 2006 (KR) .................. 10-2006-0030979

(51) Int. Cl.
*G06F 15/16* (2006.01)

(52) U.S. Cl.
USPC ........................................ 709/246

(58) Field of Classification Search
CPC ..................................... G06F 15/16
USPC ....................................... 709/219
See application file for complete search history.

(56) References Cited

U.S. PATENT DOCUMENTS

| | | | |
|---|---|---|---|
| 6,407,680 B1 * | 6/2002 | Lai et al. ................. | 341/50 |
| 2003/0158913 A1 * | 8/2003 | Agnoli et al. ............ | 709/219 |
| 2003/0200337 A1 * | 10/2003 | Jabri et al. .............. | 709/246 |
| 2003/0225723 A1 * | 12/2003 | Agarwalla et al. ...... | 707/1 |
| 2005/0074063 A1 * | 4/2005 | Nair et al. ............... | 375/240.11 |
| 2005/0138137 A1 | 6/2005 | Encarnacion et al. | |
| 2005/0138193 A1 * | 6/2005 | Encarnacion et al. .... | 709/230 |
| 2006/0089981 A1 * | 4/2006 | Ahn et al. ............... | 709/221 |
| 2006/0133513 A1 * | 6/2006 | Kounnas ................ | 375/240.26 |
| 2006/0164550 A1 * | 7/2006 | Yoshimoto et al. ..... | 348/571 |

FOREIGN PATENT DOCUMENTS

| | | | |
|---|---|---|---|
| EP | 1617333 A1 | 1/2006 | |
| WO | 2004/095293 A1 | 11/2004 | |

OTHER PUBLICATIONS

Communication issued Apr. 23, 2012 by the Republic of Korea Patent Office in counterpart Korean Application No. 10-2006-0030979.

* cited by examiner

*Primary Examiner* — Sulaiman Nooristany
(74) *Attorney, Agent, or Firm* — Sughrue Mion, PLLC

(57) ABSTRACT

A method and apparatus are provided for transcoding data to a format desired by a control point with the aid of a Universal Plug and Play (UPnP) media server. In the method and apparatus, the control point discovers the media server, detects one or more formats to which data can be transcoded by the media server, and selects one of the detected formats. The media server then transcodes the data to the format selected by the control point.

14 Claims, 8 Drawing Sheets

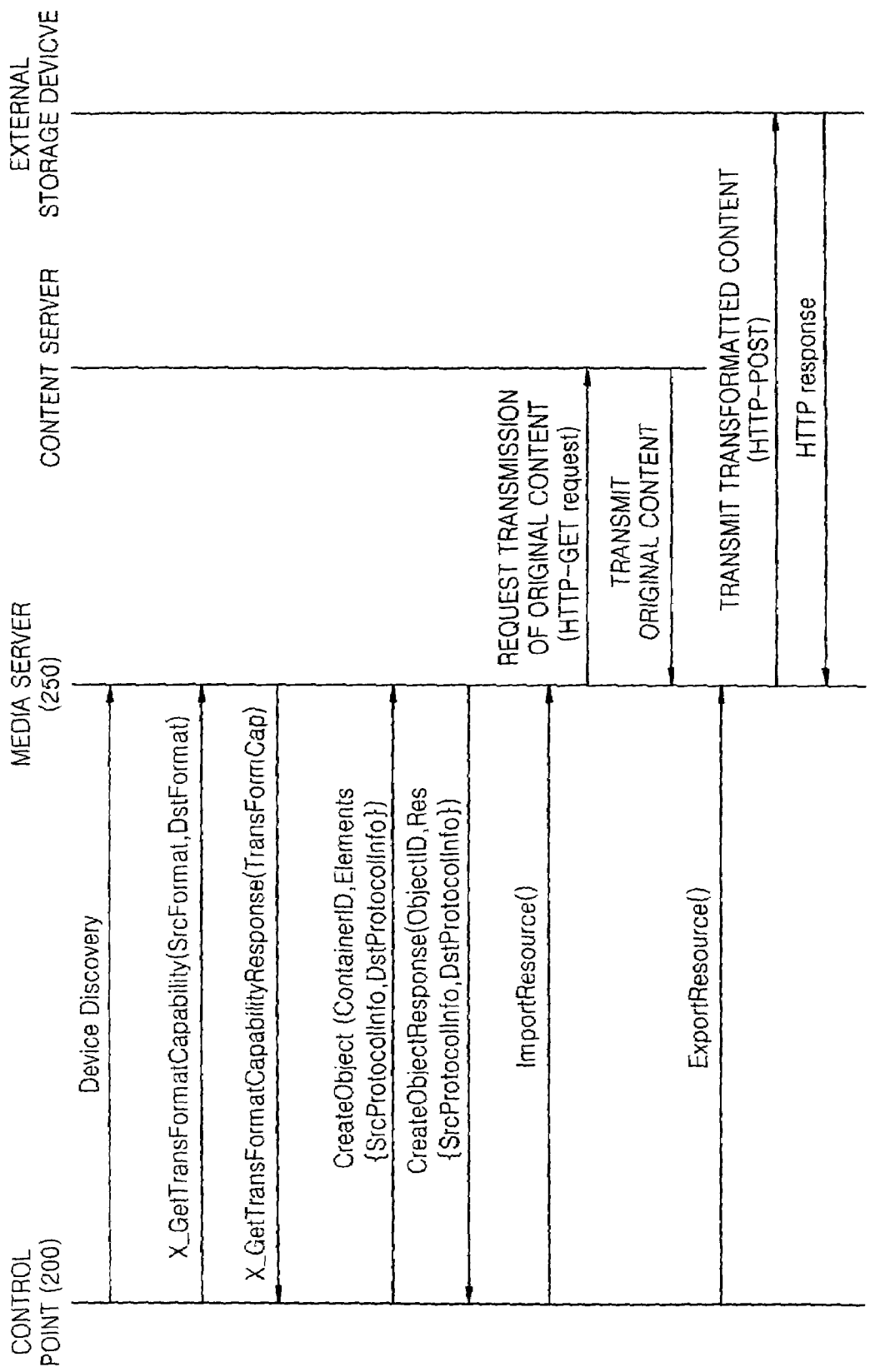

FIG. 5

```xml
<action>
  <name>X_GetTransFormatCapability</name>
  <argumentList>
   <argument>
     <name>SrcFormat</name>
     <direction>in</direction>
     <relatedStateVariable>X_A_ARG_Type_SrcFormat</relatedStateVariable>
   </argument>
   <argument>
     <name>DstFormat</name>
     <direction>in</direction>
     <relatedStateVariable>X_A_ARG_Type_DstFormat</relatedStateVariable>
   </argument>
   <argument>
      <name>Result</name>
     <direction>out</direction>
     <relatedStateVariable>X_A_ARG_Type_TransFormatCap</relatedStateVariable>
   </argument>
  </argumentList>
</action>

<stateVariable sendEvents="no">
  <name>X_A_ARG_Type_SrcFormat</name>
  <dataType>string</dataType>
</stateVariable>
<stateVariable sendEvents="no">
  <name>X_A_ARG_Type_DstFormat</name>
  <dataType>string</dataType>
</stateVariable>
<stateVariable sendEvents="no">
  <name>X_A_ARG_Type_TransFormatCap</name>
  <dataType>string</dataType>
</stateVariable>
```

FIG. 6

```
X_GetTransFormatCapability request:

X_GetTransFormatCapability(" http-post:*:video/mpeg:DLNA.ORG_PN=MPEG_TS_HD_KO ",
   " http-get:*:video/mpeg:DLNA.ORG_PN=MPEG_TS_SD_KO " )

X_GetTransFormatCapability response:

X_GetTransFormatCapability(" + http-get:*:video/mpeg:DLNA.ORG_PN=MPEG_TS_HD_KO,
http:*:video/mpeg:DLNA.ORG_PN=MPEG_TS_SD_KO,http:*:video/mpeg:DLNA.ORG_PN=MPEG_PS,
- http-get:*:video/mpeg:DLNA.ORG_PN=MPEG_TS_HD_KO upnp.org_DRMInfo=ADRM,
http:*:video/mpeg:DLNA.ORG_PN=MPEG_TS_SD_KO upnp.org_DRMInfo=BDRM" )
```

FIG. 7

| VariableName | Data Type | Allowed Value |
|---|---|---|
| transformProgress | ui4 | 0~100 |
| dstProtocolInfo | string | |
| exportUri | string | |

FIG. 8

```
CreateObject Request:

CreateObject("4", "<DIDL-Lite
  xmlns:dc="http://purl.org/dc/elements/1.1/"
  xmlns:upnp="urn:schemas-upnp-org:metadata-1-0/upnp/"
  xmlns="urn:schemas-upnp-org:metadata-1-0/DIDL-Lite/">
    <item id="9" parentID="4" restricted="0">
      <dc:title>A Thousand Years</dc:title>
      <upnp:class>object.item.videoItem</upnp:class>
      <res protocolInfo="*:*:video/mpeg:DLNA.ORG_PN=MPEG_TS_HD_KO"
        dstProtocolInfo="+http-get:*:video/mpeg:DLNA.ORG_PN=MPEG_TS_SD_KO">
      </res>
    </item>
</DIDL-Lite>")

CreateObject Response:

CreateObject("9", "<DIDL-Lite
  xmlns:dc="http://purl.org/dc/elements/1.1/"
  xmlns:upnp="urn:schemas-upnp-org:metadata-1-0/upnp/"
  xmlns="urn:schemas-upnp-org:metadata-1-0/DIDL-Lite/">
    <item id="9" parentID="4" restricted="0">
      <dc:title>A Thousand Years</dc:title>
      <upnp:class>object.item.videoItem</upnp:class>
      <res protocolInfo="http-get:*:video/mpeg:DLNA.ORG_PN=MPEG_TS_HD_KO"
  importUri="http://10.0.0.1/postdir?id=9">
      </res>
      <res protocolInfo="+http-get:*:video/mpeg:DLNA.ORG_PN=MPEG_TS_SD_KO"
        transformProgress=0 exportUri=http://10.0.0.1/getcontent.asp?id=9-1">
      </res>
    </item>
</DIDL-Lite>")
```

FIG. 9

```
<DIDL-Lite
  xmlns:dc="http://purl.org/dc/elements/1.1/"
  xmlns:upnp="urn:schemas-upnp-org:metadata-1-0/upnp/"
  xmlns="urn:schemas-upnp-org:metadata-1-0/DIDL-Lite/">
    <item id="9" parentID="4" restricted="0">
        <dc:title>A Thousand Years</dc:title>
        <upnp:class>object.item.videoItem</upnp:class>
        <res protocolInfo="http-get:*:video/mpeg:DLNA.ORG_PN=MPEG_TS_HD_KO"
    size="100000" >
            http://10.0.0.1/getcontent.asp?id=9-0
        </res>
        <res protocolInfo="http-get:*:video/mpeg:DLNA.ORG_PN=MPEG_TS_SD_KO
    DLNA.ORG_CI=1" size="20000">
            http://10.0.0.1/getcontent.asp?id=9-1
        </res>
    </item>
    <item id="11" parentID="4" restricted="0">
        <dc:title>Big Lie, Small World</dc:title>
        <dc:creator>Sting</dc:creator>
        <upnp:class>object.item.audioItem.musicTrack</upnp:class>
        <res protocolInfo="http-get:*:audio/mpeg:*" size="70000">
            http://10.0.0.1/getcontent.asp?id=11
        </res>
    </item>
</DIDL-Lite>
```

FIG. 10

```
CreateObject("9","<DIDL-Lite xmlns:dc="http://purl.org/dc/elements/1.1/"xmlns:upnp=
  "urn:schemas-upnp-org:metadata-1-0/upnp/"
  xmlns="urn:schemas-upnp-org:metadata-1-0/DIDL-Lite/">
    <item id="9" parentID="4" restricted="0">
        <dc:title>A Thousand Years</dc:title>
        <upnp:class>object.item.videoItem</upnp:class>
        <res protocolInfo="http-get:*:video/mpeg:DLNA.ORG_PN=
    MPEG_TS_HD_KO"importUri="http://10.0.0.1/postdir?id=9"></res>
        <res protocolInfo="+http-get:*:video/mpeg:DLNA.ORG_PN=
    MPEG_TS_SD_KO" transformProgress=0>
            http://10.0.0.1/getcontent.asp?id=9-1
        </res>
    </item>
</DIDL-Lite>")
```

TRANSCODING METHOD AND APPARATUS OF MEDIA SERVER AND TRANSCODING REQUEST METHOD AND APPARATUS OF CONTROL POINT

CROSS-REFERENCE TO RELATED PATENT APPLICATION

This application claims priority from Korean Patent Application No. 10-2006-0030979, filed on Apr. 5, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to Universal Plug and Play (UPnP), and more particularly, to transcoding data to a format desired by a control point with the aid of a UPnP media server.

2. Description of the Related Art

When a user wishes to download content and play back the content with a media player, the content may not be properly played back unless the format of the content complies with the format that can be played back by the media player. An increasing number of playback apparatuses such as portable multimedia players (PMPs) which can only play back content in certain formats have been developed. Thus, a trans-format function of transcoding content from one format to another is necessary for such playback apparatuses.

However, even when a UPnP media server provides such a trans-format function and can thus transcode content from one format to another, a control point may not be able to learn, through UPnP communication, the types of formats that are supported by the UPnP media server.

Also, a UPnP media server can only provide content that has been transcoded when the uploading of the content is complete.

SUMMARY OF THE INVENTION

The present invention provides a transcoding method and apparatus of a media server in which a control point discovers a media server and detects the types of formats that are supported by the media server and the media server transcodes data to a format that is chosen by the control point, and a transcoding request method and apparatus of a control point.

According to an aspect of the present invention, there is provided a transcoding method of a media server which is discovered by a control point. The transcoding method includes if a format search request regarding predetermined data is received from the control point, searching for one or more formats to which the predetermined data can be transcoded, and transmitting the identified formats to the control point in response to the format search request, and transcoding the predetermined data to one of the identified formats that is chosen by the control point.

Transcoding the predetermined data to one of the identified formats that is chosen by the control point may include receiving the selected format that is chosen by the control point, and transcoding the predetermined data to the received format.

The transcoding method may also include determining whether the predetermined data can be transcoded in real time, and transmitting a result of the determination to the control point.

The determining whether the predetermined data can be transcoded in real time, and transmitting the results of the determination to the control point may include transmitting an identifier indicating the result of the determination to the control point.

The transcoding method may also include, if it is determined that the predetermined data can be transcoded in real time, transmitting an address, from which final data obtained by the transcoding can be read, to the control point.

The transcoding method may also include, if it is determined that the predetermined data can be transcoded in real time, reporting the progress in the transcoding of the predetermined data to the control point.

The transcoding method may also include storing final data obtained by the transcoding in an external device having a predetermined address, and transmitting the predetermined address to the control point.

According to another aspect of the present invention, there is provided a transcoding request method of a control point. The transcoding request method includes discovering a media server, issuing a format search request regarding predetermined data to the media server, and receiving one or more formats for transcoding the predetermined data from the media server in response to the format search request, choosing one of the received formats, and transmitting the chosen format to the media server.

Issuing a format search request regarding predetermined data to the media server may include issuing to the media server the format search request comprising information regarding a source format of the predetermined data and a destination format to which the predetermined data is to be transcoded.

The transcoding request method may also include receiving an address, from which final data obtained by transcoding the predetermined data can be read, from the control point, and reading the final data from an external device having the received address.

According to another aspect of the present invention, there is provided a computer-readable recording medium having recorded thereon a computer program for executing the transcoding request method.

According to another aspect of the present invention, there is provided a transcoding apparatus of a media server which is discovered by a control point. The transcoding apparatus includes a format search unit which, if a format search request regarding predetermined data is received from the control point, searches for one or more formats to which the predetermined data can be transcoded, and transmits the one or more formats to the control point in response to the format search request, and a format conversion unit which transcodes the predetermined data to a selected format of the one or more formats that is chosen by the control point.

The format conversion unit may include a request receiver which receives the format search request from the control point, and a searcher which searches for the one or more formats to which the predetermined data can be transcoded, and transmits the one or more formats to the control point in response to the format search request.

The format conversion unit may include a format information receiver which receives the selected format of the one or more formats chosen by the control point, and a transcoder which transcodes the predetermined data to the format received by the format information receiver.

The transcoding apparatus may also include a real-time determination unit which determines whether the predetermined data can be transcoded in real time, and transmits a result of the determination to the control point.

The real-time determination unit may determine whether the predetermined data can be transcoded in real time, and transmit an identifier indicating the results of the determination to the control point.

The transcoding apparatus may also include an address transmission unit which, if it is determined that the predetermined data can be transcoded in real time, transmits an address from which final data obtained by the predetermined data can be read to the control point.

The transcoding apparatus may also include a changed circumstance transmission unit which, if it is determined that the predetermined data can be transcoded in real time, reports the progress in the transcoding of the predetermined data to the control point.

The transcoding method may also include an external storage unit which stores final data obtained by transcoding the predetermined data in an external device having a predetermined address, and transmits the predetermined address to the control point.

According to another aspect of the present invention, there is provided a transcoding request apparatus of a control point. The transcoding request apparatus includes a server discovery unit which discovers a media server, a transcoding request unit which issues a format search request regarding predetermined data to the media server, and a format selection unit which receives one or more formats to which the predetermined data can be transcoded from the media server in response to the format search request, chooses one of the received formats, and transmits the chosen format to the media server.

The transcoding request unit may issue to the media server the format search request comprising information regarding a source format of the predetermined data and a destination format to which the predetermined data is to be transcoded.

The format selection unit may include a selector which chooses one of the one or more formats received from the media server in response to the format search request, and a transmitter which transmits the chosen format to the media server.

The transcoding request apparatus may also include an address reception unit which receives an address from which final data obtained by transcoding the predetermined data can be read from the control point, and a data reading unit which reads the final data from an external device having the address received by the address reception unit.

BRIEF DESCRIPTION OF THE DRAWINGS

The above and other aspects of the present invention will become more apparent by describing in detail exemplary embodiments thereof with reference to the attached drawings in which:

FIG. 4 is a diagram for explaining a transcoding operation performed by a media server and a transcoding request operation performed by a control point according to another exemplary embodiment of the present invention;

FIG. 5 explains the definition of X_GetTransFormatCapability, and illustrates a plurality of parameters of X_GetTransFormatCapability;

FIG. 6 presents an example of an X_GetTransFormatCapability request;

FIG. 7 explains the definitions of res@transformprogress, res@dstProtocolInfo, and res@exportUri;

FIG. 8 presents an example of CreateObject;

FIG. 9 presents an example of a message that represents transcoded content; and

FIG. 10 presents another example of CreateObject.

DETAILED DESCRIPTION OF THE EXEMPLARY EMBODIMENTS OF THE INVENTION

The present invention will now be described more fully with reference to the accompanying drawings in which exemplary embodiments of the invention are shown.

Figure 1:
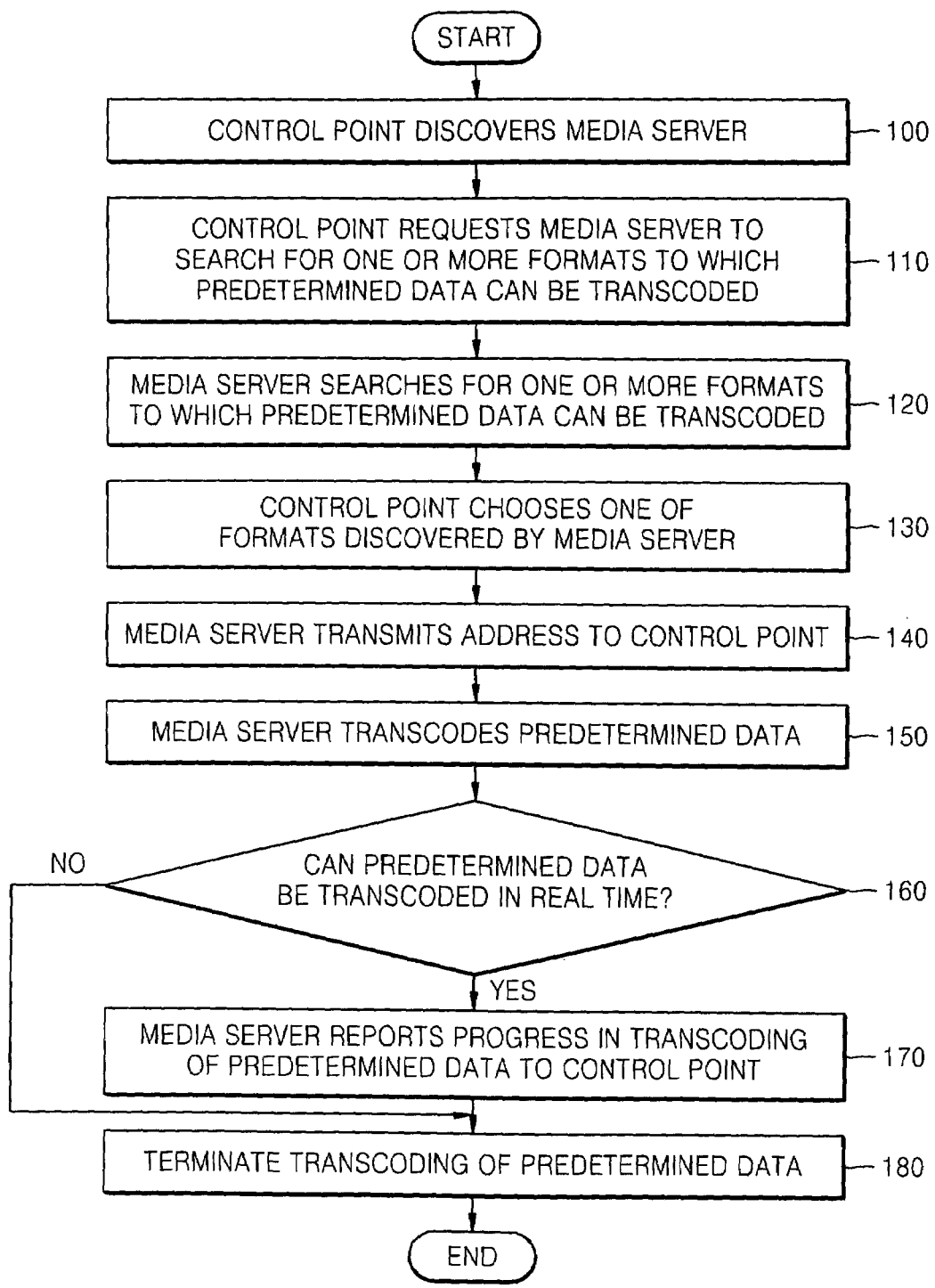
FIG. 1 is a flowchart illustrating a transcoding request method of a control point according to an exemplary embodiment of the present invention and a transcoding method of a media server according to an exemplary embodiment of the present invention.

FIG. 1 is a flowchart illustrating a transcoding request method of a control point according to an exemplary embodiment of the present invention and a transcoding method of a media server according to an exemplary embodiment of the present invention. The transcoding request method and the transcoding method will hereinafter be described in detail with reference to FIGS. 3 through 10.

Referring to FIG. 1, in operation 100, a control point searches for and discovers a media server whose services are to be controlled.

In operation 110, the control point requests the media server to search for one or more formats to which predetermined data (hereinafter referred to as the original data) can be transcoded by using X_GetTransFormatCapability(SrcFormat,DstFormat) where SrcFormat indicates a source format of the original data and DstFormat indicates a destination format to which the original data is to be transcoded. FIG. 5 explains the definition of X_GetTransFormatCapability, and illustrates a plurality of parameters of X_GetTransFormatCapability, and FIG. 6 presents an example of an X_GetTransFormatCapability request.

In operation 120, the media server searches for one or more formats to which the original data can be transcoded in response to the request of the control point, and transmits the identified formats to the control point. In detail, in operation 120, the media server transmits the identified formats to the control point using X_GetTransFormatCapabilityResponse (TransForm Cap). Here, X_GetTransFormatCapabilityResponse(TransFormCap) comprises a list of the formats to which the original data can be transcoded, and an identifier indicating whether the original data can be transcoded to any of the listed formats in real time or not. Referring to FIG. 6, if the original data can be transcoded to a listed format in real time, then a plus sign (+) may be attached as the identifier to a format string present in X_GetTransFormatCapabilityResponse corresponding to the listed format. On the other hand, if the original data cannot be transcoded to the listed format in real time, then a minus sign (−) may be attached as the identifier to the format string corresponding to the listed format. However, the exemplary embodiment of the present invention is not restricted to the signs set forth herein. In other words, signs or symbols other than a plus sign '+' and a minus sign '−' may be used as the identifier. A format that follows the identifier is SrcFormat, and a format that follows the source format is DstFormat. If TransFormCap is set to NULL, then it appears that the media server cannot transcode the original data. If the control point sets DstFormat of X_GetTransFormatCapability(SrcFormat,DstFormat) to NULL and transmits the result of the setting to the media server, then the media server responds to the control point by transmitting X_GetTransFormatCapabilityResponse(TransFormCap) including a list of the formats to which the original data can be transcoded.

In operation 130, the control point chooses one of the formats transmitted by the media server in operation 120, and transmits the chosen format to the media server. In detail, in operation 130, the control point chooses one of the formats transmitted by the media server in operation 120 using CreateObject(SrcProtocolInfo,DstProtocolInfo, ... ), and transmits the chosen format to the media server as res@dstProtocolInfo.

In operation 140, the media server transmits an address where data obtained by transcoding the original data to the format chosen in operation 130 is to be stored to the control point. In detail, in operation 140, the media server uses CreateObjectResponse(SrcProtocolInfo,DstProtocol Info, ... ). Here, the media server adds <res> in order for the control point to read transcoded data, and then adds a uniform resource locator (URL) to res@exportUri. Also, the media server attaches to a front end of a protocolInfo value an identifier (e.g., + or −) indicating whether the original data can be transcoded in real time to the format chosen in operation 130, thereby addressing the problem of compatibility that arises when the control point accesses a URL yet to be generated and attempts to execute the URL yet to be generated.

In operation 150, when an uploading request is received from the control point, the media server begins to transcode the original data to the format chosen in operation 130.

In operation 160, the media server determines whether the original data can be transcoded in real time to the format chosen in operation 130.

In operation 170, if it is determined in operation 160 that the original data can be transcoded in real time to the format chosen in operation 130, then the media server reports the progress in the transcoding of the original data to the control point as res@transformProgress.

Also, if it is determined in operation 160 that the original data can be transcoded in real time to the format chosen in operation 130, then the control point may receive the original data that is currently being transcoded from the media server and reproduce the received data.

In operation 180, when the uploading and transcoding of the original data is complete, the transcoding request method is terminated. In operation 180, properties such as res@importUri, res@dstProtocolInfo, res@exportUri, and res@transformprogress, which indicate that the transcoding of the original data is being performed, are deleted, and a message comprising information illustrated in FIG. 9 is transmitted to the control point.

According to the present exemplary embodiment, all of the formats that are provided by the media server are represented by a result value of X_GetTransFormatCapability, and the result value is a return value of GetProtocolInfo( ). Alternatively, the result value may be formed as a file, and the file may be read by HTTP GET.

In addition, according to the present exemplary embodiment, res@exportUri may be replaced by a value of <res>, as illustrated in FIG. 10.

Moreover, according to the present exemplary embodiment, the transcoding of the original data can be supported by setting an external device, such as a content server, as a source and setting an external storage device as a destination using ImportResource( ) and ExportResource( ). In detail, if the control point transmits ImportResource( ) comprising the address of a content server to the media server, the media server may request the original data to the content server, and then, the content server may transmit the original data to the media server. If the control point transmits ExportResource( ) comprising the address of an external storage device to the media server, the media server may transcode the original data transmitted by the content server, and store the result of the transcoding in the external storage device.

Figure 2:
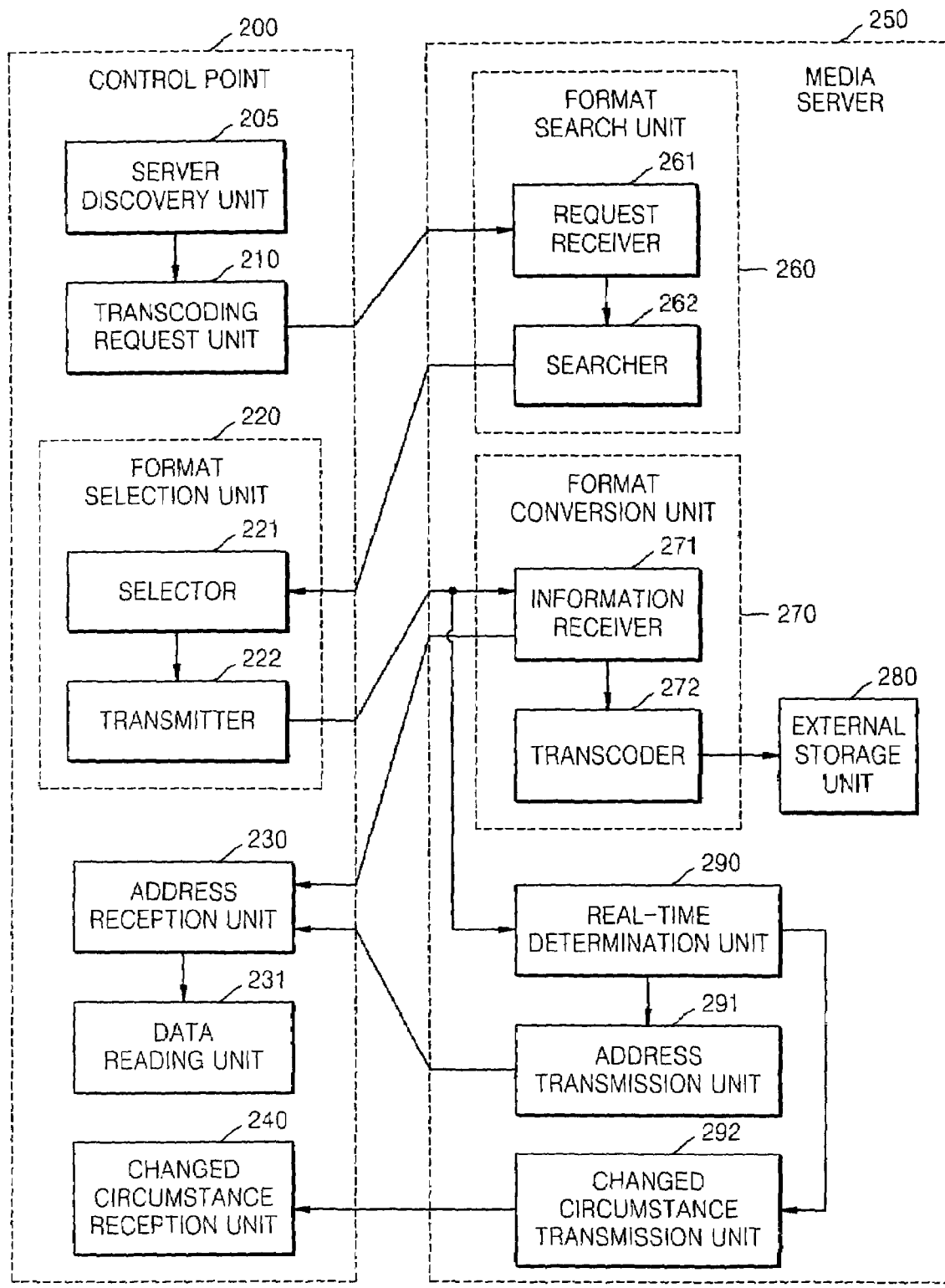
FIG. 2 is a block diagram of a control point according to an exemplary embodiment of the present invention and a media server according to an exemplary embodiment of the present invention.
Figure 3:
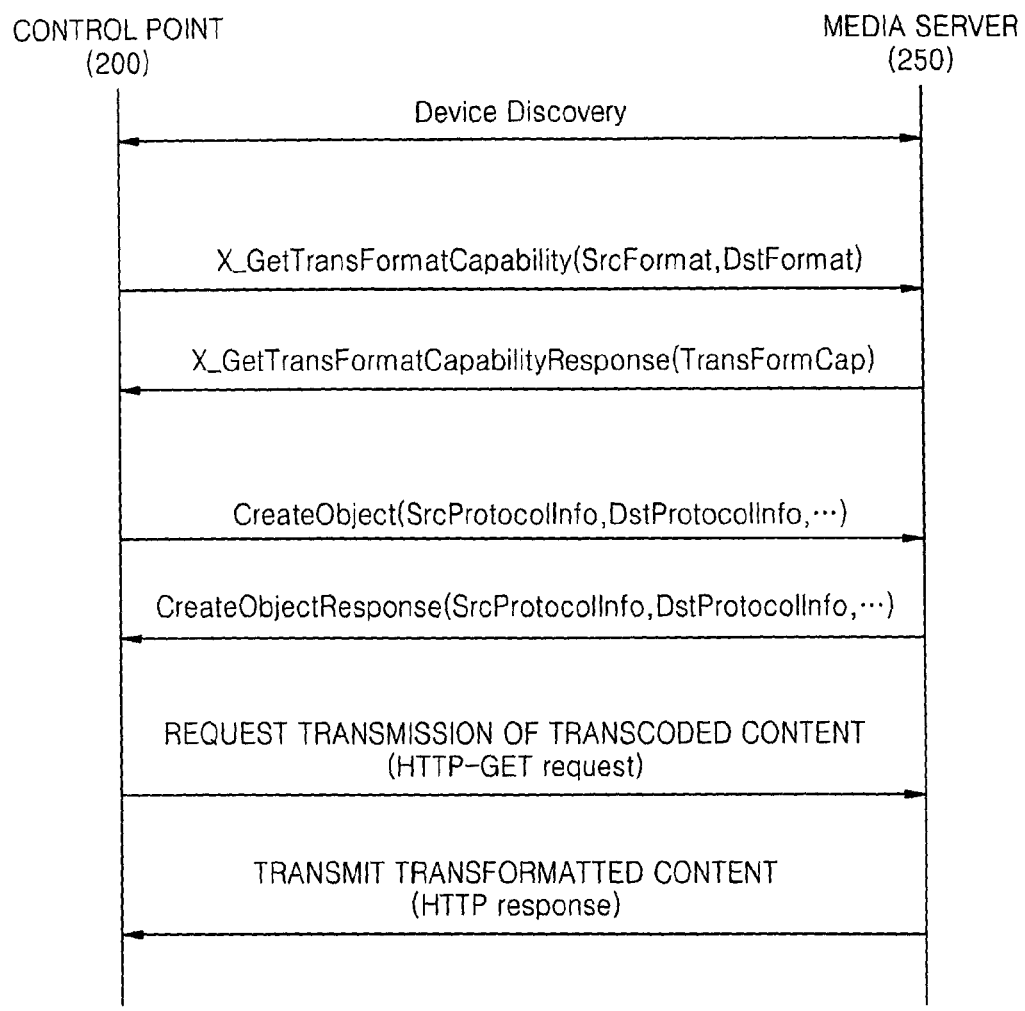
FIG. 3 is a diagram for explaining a transcoding operation performed by a media server and a transcoding request operation performed by a control point according to an exemplary embodiment of the present invention.

FIG. 2 is a block diagram of a control point 200 according to an exemplary embodiment of the present invention and a media server 250 according to an exemplary embodiment of the present invention. The transcoding request method and the transcoding method according to the exemplary embodiment of the present invention will hereinafter be described in further detail with reference to FIGS. 3 through 10.

Referring to FIG. 2, the control point 200 includes a server discovery unit 205, a transcoding request unit 210, a format selection unit 220, an address reception unit 230, a data reading unit 231, and a changed circumstance reception unit 240.

The server discovery unit 205 searches for and discovers a media server to be controlled by the control point 200, i.e., the media server 250.

The transcoding request unit 210 requests that the media server 250 search for one or more formats to which predetermined data can be transcoded. Then, the transcoding request unit 210 requests the media server 250 to transcode the predetermined data using X_GetTransFormat Capability(SrcFormat,DstFormat) where SrcFormat indicates the original format of the predetermined data, and DstFormat indicates a destination format to which the predetermined data is to transcoded. FIG. 5 explains the definition of X_GetTransFormatCapability, and illustrates a plurality of parameters of X_GetTransFormatCapability, and FIG. 6 illustrates an example of a X_GetTransFormatCapability request.

The format selection unit 220 chooses one of the formats identified by the media server 250, and transmits the chosen format to the media server 250. The format selection unit 220 includes a selector 221 and a transmitter 222.

The selector 221 chooses one of the formats identified by the media server 250.

The transmitter 222 transmits the format chosen by the selector to the media server 250. In detail, the transmitter 222 transmits the format chosen by the selector to the media server 250 as res@dstProtocolInfo by using CreateObject (SrcProtocolInfo,DstProtocolInfo, ... ).

The address reception unit 230 receives an address of an external storage device where final data obtained by the transcoding performed by the media server 250 is to be stored.

The data reading unit 231 reads the final data from the external storage device by referencing the address received by the address reception unit 230. Also, the data reading unit 231 may read the predetermined data that is being transcoded, if necessary, and enables the control point 200 to reproduce the read data if the media server 250 is capable of transcoding data in real time.

If the media server 250 is capable of transcoding data in real time, the changed circumstance reception unit 240 may be notified of the progress in the transcoding of the predetermined data by the media server 250. The progress in the transcoding of the predetermined data may be determined with reference to res@transformProgress.

The media server 250 includes a format search unit 260, a format conversion unit 270, an external storage unit 280, a real-time determination unit 290, an address transmission unit 291, and a changed circumstance transmission unit 292.

When a transcoding request is received from the control point 200, the format search unit 260 searches for one or more formats to which the original data can be transcoded, and transmits the identified formats to the control point 200. The format search unit 260 includes a request receiver 261 and a searcher 262.

The request receiver 261 receives a transcoding request from the transcoding request unit 210.

The searcher 262 searches for one or more formats to which the original data can be transcoded by the media server 250 in response to the transcoding request received by the request receiver 261, and transmits the identified formats to the selector 221 by using X_GetTransFormatCapabilityResponse(TransFormCap). Here, X_GetTrans FormatCapabilityResponse(TransFormCap) comprises a list of formats to which the original data can be transcoded by the media server 250, and an identifier indicating whether the media server 250 can transcode the original data to each of the listed formats in real time. If the media server 250 can transcode the original data to a listed format in real time, a plus sign (+) may be attached as the identifier to a format string corresponding to the listed format, as indicated by X_GetTransFormatCapability of FIG. 6. On the other hand, if the media server 250 cannot transcode the original data to the listed format in real time, a minus sign (−) may be attached as the identifier to the format string corresponding to the listed format as indicated by X_GetTransFormatCapability of FIG. 6. However, the exemplary embodiment of the present invention is not restricted to the signs set forth herein. A format that follows the identifier is SrcFormat, and a format that follows SrcFormat is DstFormat. If TransFormCap is set to NULL, then it appears that the media server 250 cannot transcode the original data. If the control point 200 sets DstFormat of X_GetTransFormatCapability(SrcFormat,DstFormat) to NULL and transmits the result of the setting to the media server 250, then the media server 250 responds to the control point 200 by transmitting X_GetTrans FormatCapabilityResponse(TransFormCap) including a list of the formats to which the original data can be transcoded.

The format conversion unit 270 converts the original data to a format chosen by the control point 200. The format conversion unit 270 includes an information receiver 271 and a transcoder 272.

The information receiver 271 receives the format chosen by the selector 221 from the transmitter 222. The information receiver 271 transmits to the address reception unit 230 an address at which final data that is obtained by transcoding the original data to the format chosen by the selector 221 is to be stored. The information receiver 271 makes a response using CreateObjectResponse(SrcProtocolInfo,DstProtocol Info, . . . ). Here, the information receiver 271 adds <res> in order for the control point 200 to read transcoded data, and then adds a URL to res@exportUri. Also, the information receiver 271 provides an identifier such as a plus sign (+) or a minus sign (−) indicating whether the original data can be transcoded in real time to the format chosen by the selector 221, thereby addressing the problem of compatibility that arises when the control point 200 accesses a URL yet to be generated and attempts to execute the URL yet to be generated.

When an uploading request is received from the control point 200, the transcoder 272 transcodes the original data to the format chosen by the selector 221.

The transcoder 272 terminates the transcoding of the original data when the uploading and transcoding of the original data are complete. Also, the transcoder 272 deletes properties such as res@importUri, res@dstProtocolInfo, res@exportUri, and res@transformprogress which indicate the transcoding of the original data is being performed, and transmits a message comprising the information illustrated in FIG. 9.

The real-time determination unit 290 determines whether the original data can be transcoded in real time to the format chosen by the selector 221.

If the real-time determination unit 290 determines that the original data can be transcoded in real time to the format chosen by the selector 221, then the address transmission unit 291 transmits an address of an external storage device (not shown) where the final data is to be stored to the address reception unit 230.

If the real-time determination unit 290 determines that the original data can be transcoded in real time to the format chosen by the selector 221, then the changed circumstance transmission unit 292 reports the progress in the transcoding of the original data to the changed circumstance reception unit 240 as res@transformProgress.

According to the present exemplary embodiment, all the formats that are provided by the media server 250 are represented by a result value of X_GetTransFormatCapability, and the result value is a return value of GetProtocolInfo( ). Alternatively, the result value may be formed as a file, and the file may be read by HTTP GET.

In addition, according to the present exemplary embodiment, res@exportUri may be replaced by a value of <res>, as illustrated in FIG. 10.

Moreover, according to the present exemplary embodiment, the transcoding of the original data can be supported by setting an external device such as a content server as a source and setting an external storage device as a destination using ImportResource( ) and ExportResource( ). In detail, if the control point 200 transmits ImportResource( ) comprising the address of a content server to the media server 250, the media server 250 may request the original data to the content server, and then, the content server may transmit the original data to the media server 250. If the control point 200 transmits ExportResource( ) comprising the address of an external storage device to the media server 250, the media server 250 may transcode the original data transmitted by the content server, and store the result of the transcoding in the external storage device.

The exemplary embodiment of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the exemplary embodiment of the present invention can be easily construed by one of ordinary skill in the art.

According to the exemplary embodiment of the present invention, a control point discovers a media server, detects one or more formats to which original data can be transcoded by the media server, and chooses one of the detected formats. Then, the media server transcodes the original data to the detected format chosen by the control point.

Therefore, it is possible to easily convert content possessed by a user from one format to another using a transformat function of a media server that exists in a network. In addition, since a control point detects one or more formats to which content can be transcoded by a media server and transcodes the content so that the content can be reproduced by the control point, it is possible to maximize user convenience. Moreover, it is possible for the control point to reproduce content at any time desired by a user, particularly, even during the transcoding of the content by the media server.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A transcoding method of a media server which is discovered by a control point through a communication network, the transcoding method comprising:
   receiving a format search request regarding original content through the communication network, wherein the format search request is a request to search for at least one format to which the original content can be transcoded by the media server;
   searching for at least one format to which the original content can be transcoded by the media server in response to the format search request to generate a list of one or more formats to which the original content can be transcoded;
   determining whether the original content can be transcoded in real time;
   transmitting, to the control point through the communication network, in response to the format search request, a response message comprising (i) the list of one or more formats to which the original content can be transcoded and (ii) an identifier indicating whether the original content can be transcoded in real time based on the determining;
   receiving, from the control point through the communication network, a selected format that is selected, from among the one or more formats included in the list, by the control point;
   transcoding the original content to the selected format; and
   if it is determined that the original content can be transcoded in real time, transmitting an address, from which final content obtained by the transcoding can be read, to the control point.

2. The transcoding method of claim 1, further comprising, if it is determined that the original content can be transcoded in real time, reporting progress in the transcoding of the original content to the control point.

3. The transcoding method of claim 1, further comprising storing the final content obtained by the transcoding in an external device having the address.

4. A transcoding request method of a control point, the transcoding request method comprising:
   discovering a media server through a communication network;
   issuing a format search request regarding original content to the media server through the communication network, wherein the format search request is a request to search for at least one format to which the original content can be transcoded by the media server;
   receiving, from the media server through the communication network, in response to the format search request, a response message comprising (i) a list of one or more formats to which the original content can be transcoded by the media server based on a search by the media server and (ii) an identifier indicating whether the original content can be transcoded in real time based on a determination by the media server;
   selecting, from among the one or more formats included in the list received from the media server, a format;
   transmitting the selected format to the media server through the communication network; and
   receiving, from the media server based on a determination that the original content can be transcoded in real time, an address from which final content obtained by transcoding the original content can be read.

5. The transcoding request method of claim 4, wherein the issuing the format search request regarding the original content to the media server comprises issuing to the media server the format search request comprising information regarding a source format of the original content and a destination format to which the original content is to be transcoded.

6. The transcoding request method of claim 4, further comprising:
   reading the final content from an external device comprising the received address.

7. A non-transitory computer-readable recording medium having recorded thereon a computer program for executing a transcoding method of a media server which is discovered by a control point through a communication network, the method comprising:
   receiving a format search request regarding original content through the communication network, wherein the format search request is a request to search for at least one format to which the original content can be transcoded by the media server;
   searching for at least one format to which the original content can be transcoded by the media server in response to the format search request to generate a list of one or more formats to which the original content can be transcoded;
   determining whether the original content can be transcoded in real time;
   transmitting, to the control point through the communication network, in response to the format search request, a response message comprising (i) the list of one or more formats to which the original content can be transcoded and (ii) an identifier indicating whether the original content can be transcoded in real time based on the determining;
   receiving, from the control point through the communication network, a selected format that is selected, from among the one or more formats included in the list, by the control point;
   transcoding the original content to the selected format; and
   if it is determined that the original content can be transcoded in real time, transmitting an address, from which final content obtained by the transcoding can be read, to the control point.

8. A transcoding apparatus of a media server which is discovered by a control point through a communication network, the transcoding apparatus comprising:
   a format search unit which:
      receives a format search request regarding original content from the control point through the communication network, wherein the format search request is a request to search for at least one format to which the original content can be transcoded by the media server, and
      searches for at least one format to which the original content can be transcoded by the media server in response to the format search request to generate a list of one or more formats to which the original content can be transcoded;

a real-time determination unit which determines whether the original content can be transcoded in real time, wherein the format search unit transmits, to the control point through the communication network, in response to the format search request, a response message comprising (i) the list of one or more formats to which the original content can be transcoded and (ii) an identifier indicating whether the original content can be transcoded in real time based on the determination by the real-time determination unit;

a format conversion unit, embodied on a processor with a memory, which receives, from the control point through the communication network, a selected format that is selected, from among the one or more formats included in the list, by the control point, and transcodes the original content to the selected format; and an address transmission unit which, if it is determined that the original content can be transcoded in real time, transmits an address, from which final content obtained by the original content can be read, to the control point.

9. The transcoding apparatus of claim 8, further comprising a changed circumstance transmission unit which, if it is determined that the original content can be transcoded in real time, reports progress in the transcoding of the original content to the control point.

10. The transcoding apparatus of claim 8, further comprising an external storage unit which stores the final content obtained by transcoding the original content in an external device having the address.

11. A transcoding request apparatus of a control point comprising:

a server discovery unit which discovers a media server through a communication network;

a transcoding request unit which issues a format search request regarding original content to the media server through the communication network, wherein the format search request is a request to search for at least one format to which the original content can be transcoded by the media server;

a format selection unit, embodied on a processor with a memory, which receives, from the media server through the communication network, in response to the format search request, a response message comprising (i) a list of one or more formats to which the original content can be transcoded by the media server based on a search by the media server and (ii) an identifier indicating whether the original content can be transcoded in real time based on a determination by the media server, which selects, from among the one or more formats included in the list received from the media server, a format, and which transmits the selected format to the media server through the communication network; and an address reception unit which receives, from the media server based on a determination that the original content can be transcoded in real time, an address from which final content obtained by transcoding the original content can be read.

12. The transcoding request apparatus of claim 11, wherein the transcoding request unit issues to the media server the format search request comprising information regarding a source format of the original content and a destination format to which the original content is to be transcoded.

13. The transcoding request apparatus of claim 11, further comprising:

a content reading unit which reads the final content from an external device having the address received by the address reception unit.

14. The transcoding request apparatus of claim 11, further comprising a changed circumstance reception unit which receives reports on progress of the transcoding of the original content for the control point.

* * * * *